:::
United States Patent Office 3,092,459
Patented June 4, 1963

---

3,092,459
PROCESS FOR PREPARING NITRONIUM HEXAFLUOROPHOSPHATE AND NITRYL FLUORIDE
Charles S. Cleaver, Wilmington, Del., assignor to E. I. du Pont de Nemours and Company, Wilmington, Del., a corporation of Delaware
No Drawing. Filed Oct. 1, 1958, Ser. No. 764,510
11 Claims. (Cl. 23—203)

This invention relates to nitryl fluoride and to its preparation. More particularly, this invention relates to the preparation of nitronium hexafluorophosphate and a process for preparing nitryl fluoride therefrom.

Nitryl fluoride is a low molecular weight fluorine compound of potential use as a fluorinating and nitrating agent and as a powerful oxidant. The high chemical reactivity of this compound makes it a prime research candidate. Hitherto it has been prepared by (a) reaction of fluorine with sodium nitrite, (b) reaction of nitryl chloride with silver (I) fluoride, (c) reaction of nitronium tetrafluoroborate with sodium fluoride, (d) reaction of nitric oxide with fluorine, and (e) reaction of nitrogen pentoxide with sodium fluoride. Although these are useful laboratory preparations, if the full potential of nitryl fluoride is to be realized better methods for its synthesis are needed. In research aimed at finding new and better synthetic routes to nitryl fluoride it now has been found that this interesting chemical is readily obtained by preparing nitronium hexafluorophosphate and decomposing it according to the present invention.

It is an object of this invention to provide a novel process for preparing nitryl fluoride. A further object is to provide a process for preparing nitryl fluoride from nitronium hexafluorophosphate. A still further object is to provide a process for preparing nitryl fluoride starting with phosphorus pentafluoride and fuming nitric acid and then decomposing the resulting nitronium hexafluorophosphate. Other objects will appear hereinafter.

These and other objects of this invention are accomplished by the following process for preparing nitryl fluoride which comprises heating and reacting dry nitronium hexafluorophosphate with an anhydrous alkali metal fluoride, and separating nitryl fluoride as the resulting product. The process of this invention also includes preparation of nitryl fluoride by the process which comprises adding phosphorus pentafluoride to fuming nitric acid thereby forming nitronium hexafluorophosphate, drying said nitronium hexafluorophosphate and intimately mixing it with an anhydrous alkali metal fluoride, heating and reacting the dry nitronium hexafluorophosphate with the anhydrous alkali metal fluoride, and separating nitryl fluoride as the resulting product.

In a preferred embodiment of preparing nitryl fluoride from preformed nitronium hexafluorophosphate, dried sodium fluoride and nitronium hexafluorophosphate are intimately mixed under anhydrous conditions and placed in a platinum tube connected to a train of three traps maintained at $-10°$ C., $-80°$ C., and $-190°$ C. and to a source of dry nitrogen. While sweeping the tube with nitrogen, the contents of the tube are heated at $200°$ C. The brown fumes which are initially evolved are collected as a cream-colored solid in the $-80°$ C. trap and are identified as $N_2O_4$. White crystals deposit in the $-190°$ C. trap. The trap is removed from the train, evacuated while maintained at $-190°$ C., and the contents distilled into a collecting vessel maintained at $-190°$ C. The white crystals melt to a colorless liquid which distills below $-80°$ C. at reduced pressure and correspond to nitryl fluoride, as determined by the formation of a derivative, $(NO_2)_2SiF_6$, with $SiF_4$.

In another preferred embodiment of preparing nitryl fluoride starting with phosphorus pentafluoride and fuming nitric acid (90% $HNO_3$), the nitric acid is placed in a reactor, inert to hydrogen fluoride, and phosphorus pentafluoride is added slowly through a tube extending below the surface of the liquid. The thick slurry which forms is filtered under nitrogen and the solid transferred immediately to a receptacle made of material inert to hydrogen fluoride. The product is dried under vacuum over a dehydrating agent. The white solid thus obtained is nitronium hexafluorophosphate. This product is transferred to the platinum tube reactor previously described and reacted with anhydrous sodium fluoride as already described to produce nitryl fluoride.

The examples which follow illustrate but do not limit this invention.

*Example 1*

Twenty grams of predried sodium fluoride (0.48 mole) was intimately mixed under anhydrous conditions with 20 grams (0.0105 mole) of nitronium hexafluorophosphate and the mixture placed in a platinum tube. The tube was then connected to three carefully dried traps connected in series at $-10°$ C., $-80°$ C., and $-190°$ C. The contents of the tube were heated at $200°$ C. for 3 hours under a slow flowing current of anhydrous nitrogen. Brown fumes were initially evolved and condensed in the trap at $-80°$ C. as a cream-colored solid. White crystals were deposited in the $-190°$ C. trap. The product in the $-80°$ C. trap volatilized to a red-brown gas at room temperature. The $-190°$ C. trap was removed from the train, evacuated at $-190°$ C., and the contents distilled to a stainless steel cylinder maintained at $-190°$ C. The white crystals on warming melted to a clear, colorless liquid, which distilled below $-80°$ C. at sub-atmospheric pressure. There were obtained 3.2 grams of product, which corresponds to a 48% yield, based on the nitronium hexafluorophosphate processed. The product was identified as nitryl fluoride by preparation of a derivative, nitronium hexafluorosilicate, as follows:

A stream of silicon tetrafluoride was mixed with the volatilized white crystalline reaction product after the manner described by E. E. Aynsley et al., J. Chem. Soc. 1954, 1119. Small white crystals deposited in the tube. Volatile material was removed by evacuation and the crystalline material removed from the tube. The product analyzed 48.03% F and 12.02% Si. Theory requires 48.80% F and 11.97% Si for $(NO_2)_2SiF_6$.

Heat-treatment at $400°$ to $600°$ C. of the reactor tube, following removal of the nitryl fluoride, yielded an additional amount of white, sublimable solid in the $-190°$ C. trap, which was found by infrared analysis to be 90% $PF_5$. This is an important finding as it demonstrates that this synthesis of nitryl fluoride is based essentially on sodium fluoride (and $HNO_3$) inasmuch as some of the $PF_5$ required for the formation of the nitronium hexafluorophosphate is recovered for re-use.

*Example II*

One hundred seventy-eight grams of fuming nitric acid (90% $HNO_3$) was placed in a polyethylene vessel. Phosphorus pentafluoride (116 g.) was added slowly to the acid through a stainless steel tube extending beneath the surface of the liquid, and 104 g. was rapidly absorbed with some heat evolution and simultaneous appearance of white crystals. After a few minutes, the thick slurry was concentrated in vacuo and the solid transferred immediately to a polyethylene vessel and dried over $P_2O_5$ at 1 mm. in a desiccator. There was obtained 56 g. of nitronium hexafluorophosphate, which represents a 35.5% yield based on the 116 g. of $PF_5$ added.

The product from another experiment similar to the above analyzed:

Found—P, 15.67%; F, 58.18%. Calcd. for NO$_2$PF$_6$—P, 16.22%; F, 59.7%.

Addition of the above product to benzene at room temperature caused rapid nitration and produced nitrobenzene.

The nitronium hexafluorophosphate prepared as above was converted to nitryl fluoride in the equipment and by the procedure described in Example I.

In the preparation of nitryl fluoride, theoretically the nitronium hexafluorophosphate and sodium fluoride are required in equimolar amounts. In practice, it is desirable to use the sodium fluoride in excess of the theoretical amount to insure maximum utilization of the costlier nitronium hexafluorophosphate. At least two moles of sodium fluoride per mole of nitronium hexafluorophosphate are desirable but since better results are obtained with a larger excess, generally four or more moles of sodium fluoride are preferably employed.

The reaction between the nitronium hexafluorophosphate and sodium fluoride can be carried out at temperatures as low as 130° C., or as high as 400° C. Since the best balance of reaction rate and yield of desired reaction product, with good temperature control, is achieved within the range 150° to 300° C., this embraces the conditions generally used.

As generally operated the reaction between the nitronium hexafluorophosphate and sodium fluoride is carried out at atmospheric pressure. This has practical advantages in simplifying equipment design and reducing costs. If desired, however, the reaction can be carried out at super- or sub-atmospheric pressures.

The process is carried out under anhydrous conditions and in equipment which is made of material inert to nitryl fluoride. Platinum, silver, and the like are suitable.

Instead of nitrogen there can be used any other inert or unreactive atmosphere, such as the inert gases, e.g., argon and helium. Because of lower costs, nitrogen is generally employed.

Nitryl fluoride is a colorless gas, B.P. —72.4° C., M.P. —166° C. It is a known nitrating agent for aromatic hydrocarbons (J. Chem. Soc. 1954, 3512-14). It is also useful as a fluorinating agent and as an oxidant in rocket fuels (J. Space Flight 2, 1-4 (1950)).

Although in the specific illustrative examples sodium fluoride has been used, it is to be understood that in its place there can be used any other alkali metal fluoride, for example, potassium, lithium, or cesium fluoride. Because of lower cost and ready availability, sodium fluoride is generally used.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing nitryl fluoride which comprises adding phosphorus pentafluoride to fuming nitric acid thereby forming nitronium hexafluorophosphate, drying said nitronium hexafluorophosphate, intimately mixing the dry nitronium hexafluorophosphate with an anhydrous alkali metal fluoride, heating and reacting in an inert atmosphere said dry nitronium hexafluorophosphate with said anhydrous alkali metal fluoride at a temperature within the range of 130-400° C., and separating nitryl fluoride as the resulting product.

2. Process for preparing nitryl fluoride which comprises adding phosphorus pentafluoride to fuming nitric acid thereby forming nitronium hexafluorophosphate, drying said nitronium hexafluorophosphate, intimately mixing the dry nitronium hexafluorophosphate with an anhydrous alkali metal fluoride, heating and reacting in an inert atmosphere said dry nitronium hexafluorophosphate with said anhydrous alkali metal fluoride at a temperature within the range of 150 to 300° C., and separating nitryl fluoride as the resulting product.

3. Process for preparing nitryl fluoride which comprises heating and reacting in an inert atmosphere dry nitronium hexafluorophosphate with an anhydrous alkali metal fluoride at a temperature within the range of 130–400° C., and separating nitryl fluoride as the resulting product.

4. Process for preparing nitryl fluoride which comprise heating and reacting in an inert atmosphere dry nitronium hexafluorophosphate with an anhydrous alkali metal fluoride at a temperature within the range of 150 to 300° C., and separating nitryl fluoride as the resulting product.

5. Process for preparing nitryl fluoride which comprises adding phosphorus pentafluoride to fuming nitric acid thereby forming nitronium hexafluorophosphate, drying said nitronium hexafluorophosphate, intimately mixing the dry nitronium hexafluorophosphate with anhydrous sodium fluoride, heating and reacting in an inert atmosphere said dry nitronium hexafluorophosphate with said anhydrous sodium fluoride at a temperature within the range of 130 to 400° C., and separating nitryl fluoride as the resulting product.

6. Process for preparing nitryl fluoride which comprises adding phosphorus pentafluoride to fuming nitric acid thereby forming nitronium hexafluorophosphate, drying said nitronium hexafluorophosphate, intimately mixing the dry nitronium hexafluorophosphate with anhydrous sodium fluoride, heating and reacting in an inert atmosphere said dry nitronium hexafluorophosphate with said anhydrous sodium fluoride at a temperature within the range of 150 to 300° C., and separating nitryl fluoride as the resulting product.

7. Process for preparing nitryl fluoride which comprises heating and reacting in an inert atmosphere dry nitronium hexafluorophosphate with anhydrous sodium fluoride at a temperature within the range of 130 to 400° C., and separating nitryl fluoride as the resulting product.

8. Process for preparing nitryl fluoride which comprises heating and reacting in an inert atmosphere dry nitronium hexafluorophosphate with anhydrous sodium fluoride at a temperature within the range of 150 to 300° C., and separating nitryl fluoride as the resulting product.

9. Process for preparing nitryl fluoride which comprises heating and reacting in an inert atmosphere at atmospheric pressure and at a temperature within the range of 150 to 300° C., dry nitronium hexafluorophosphate with at least four molar proportions of anhydrous sodium fluoride per mole of nitronium hexafluorophosphate, and separating nitryl fluoride as the resulting product.

10. A process for preparing nitronium hexafluorophosphate which consists of reacting phosphorus pentafluoride with fuming nitric acid.

11. The process of claim 6 wherein the residue remaining after the separation of nitryl fluoride is heated to regenerate phosphorus pentafluoride and sodium fluoride.

References Cited in the file of this patent

FOREIGN PATENTS 918,506    Germany _____ Sept. 27, 1854

OTHER REFERENCES

Maddock et al.: "Recent Aspects of the Inorganic Chemistry of Nitrogen," 1957, special publication No. 10 of the Chemical Society, London, pages 27 and 28.

Gmelin: "Handbuch Der Anorganischen Chemie," 8th edition, 1936, System No. 4, Stockstoff, page 1018.

Simons: "Fluorine Chemistry," vol. II, pages 18–20 (1954).

Woolf et al.: "J. Chem. Soc.," pages 1050–1052 (1950); and pages 1053–1056 (1950).

Chemical Society Journal, Pt. 1, 1954, pages 1119–1124.